Figure 2:
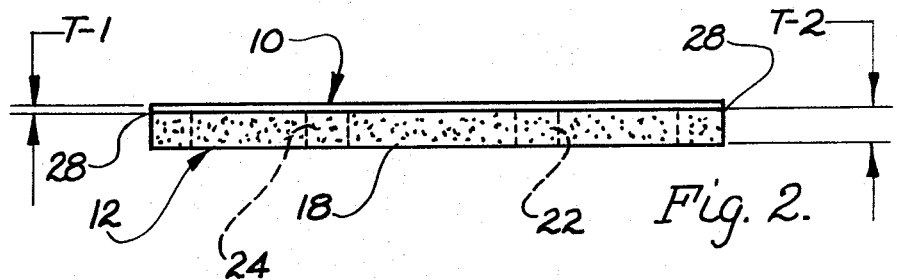

United States Patent
Hegenberger

[15] 3,673,730
[45] July 4, 1972

[54] FLY SWATTER

[72] Inventor: John N. Hegenberger, Columbus, Ohio

[73] Assignees: Joseph J. Jacobs, Columbus; Joseph W. Loomis, Johnstown; Bruce A. Lehner, Columbus, Ohio ; part interest to each

[22] Filed: Dec. 8, 1969

[21] Appl. No.: 883,096

[52] U.S. Cl. ................................................................43/137
[51] Int. Cl. ..........................................................A01m 3/02
[58] Field of Search....................................................43/137

[56] References Cited

UNITED STATES PATENTS

| | | | |
|---|---|---|---|
| 1,268,640 | 6/1918 | Stearns | 43/137 |
| 1,299,580 | 4/1919 | Krumlaw | 43/137 |
| 2,736,129 | 2/1956 | Roop | 43/137 |
| 1,860,939 | 5/1932 | Miller | 43/137 |

FOREIGN PATENTS OR APPLICATIONS

| 401,417 | 11/1933 | Great Britain | 43/137 |
|---|---|---|---|

Primary Examiner—Warner H. Camp
Attorney—Schmieding & Fultz

[57] ABSTRACT

An improved fly swatter blade for killing insects without squashing them which consists of a perforated sheet of relatively resilient plastic material to which is bonded relatively thick cushioning strips formed of soft sponge-like plastic material.

1 Claim, 2 Drawing Figures

PATENTED JUL 4 1972

3,673,730

INVENTOR.
JOHN N. HEGENBERGER
BY
Schmieding & Fultz
ATTORNEYS

FLY SWATTER

This invention relates to fly swatters and more particularly to a swatter having an improved blade of composite plastic construction.

In general, the improved fly swatter blade of the present invention consists of a composite plastic blade that includes a perforated sheet of a relatively rigid resilient plastic material such as polyethylene. The blade further includes relatively thick cushioning strips bonded to said sheet and formed of relatively soft sponge-like plastic material such as polyester urethane of from 2 to 4 pounds per cubic foot density.

As one aspect of the present invention, the soft cushioning strips are bonded to the relatively stiff resilient sheet at spaced intervals with a suitable flexible plastic bonding agent so as to maintain both the relatively rigid and soft cushioning characteristics of the composite blade assembly.

As another aspect of the present invention, the cushioning strips are relatively thick as compared to the thickness of the resilient sheet with the advantageous result that flies and insects are killed without crushing them by the combined action, upon impact with a fly supporting surface, of the slight bending or yielding of the resilient sheet and high degree of yielding of the relatively thick and soft cushioning strips.

As another aspect of the present invention, the novel swatter blade, due to its novel composite plastic construction, can be inexpensively fabricated at high rates of production by fabricating resilient sheet portions by injection moulding or other suitable means, and by die cutting cushioning means from standard sheets of polyester urethane or the like, and by bonding said cushion portions to said resilient sheets in a suitable bonding and pressing apparatus.

It is therefore an object of the present invention to provide an improved fly swatter blade of novel composite plastic construction that includes relatively thick, soft cushioning strips bonded to a relatively stiff resilient sheet portion the combined action of which kills flies and other insects without crushing them so as to avoid staining the swatted surface.

It is another object of the present invention to provide a novel swatter blade of composite construction that can be economically fabricated at high rates of production.

Further objects and advantages of the present invention will be apparent from the following description, reference being had to the accompanying drawings wherein a preferred form of embodiment of the invention is clearly shown.

IN THE DRAWINGS

Figure 1:
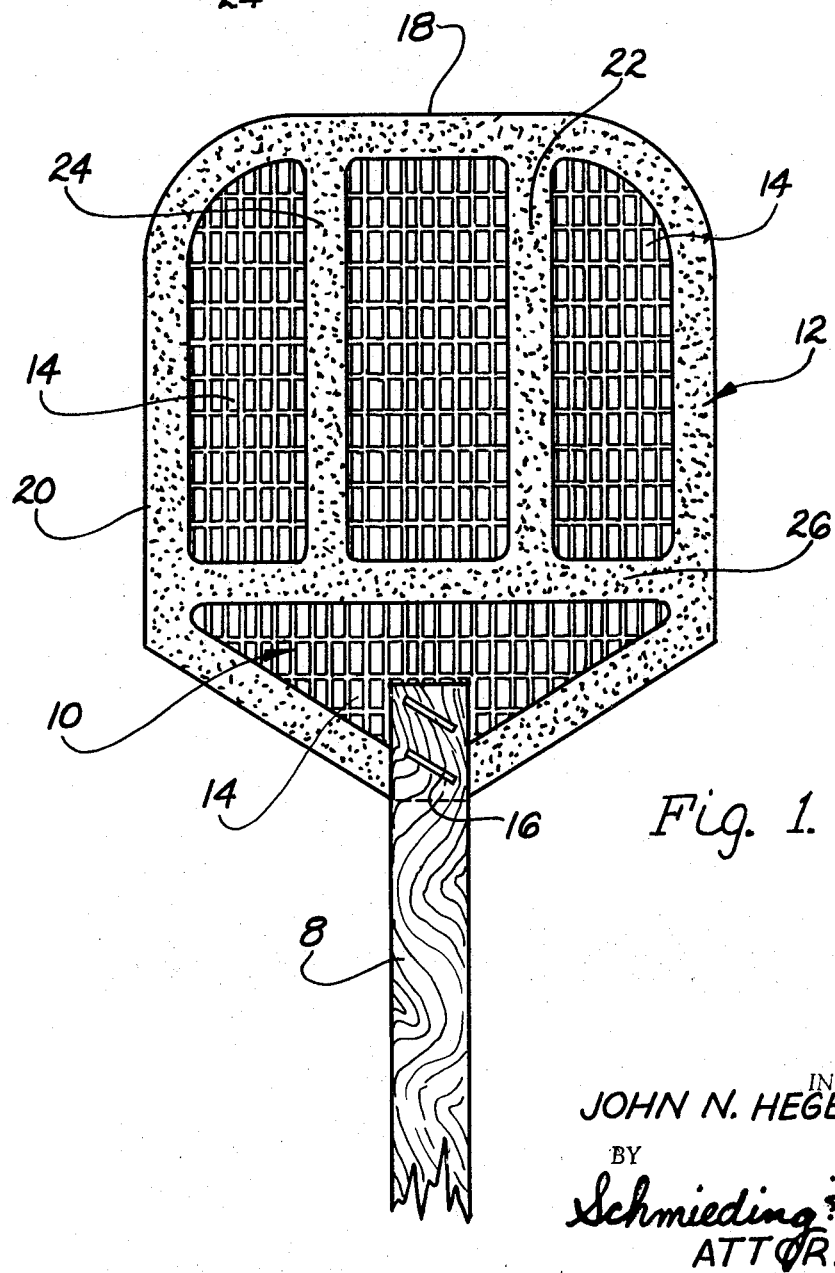

FIG. 1 is a plan view of a fly swatter blade constructed in accordance with the present invention; and FIG. 2 is an end elevational view of the swatter blade of FIG. 1.

Referring in detail to the drawings, a fly swatter constructed in accordance with the present invention comprises a blade means that includes a sheet portion indicated generally at 10 is preferably formed of polyethylene or other suitable resilient yet relatively stiff, material to provide sufficient rigidity against the force of air flowing through the plurality of openings 14 during a swatting operation.

A cushioning means 12 is bonded to sheet 10 by a layer of mastic or plastic bonding agent 28, FIG. 2, and includes peripheral cushioning strips 18 and 20 and transverse cushioning strips 22, 24 and 26. It will be understood that the pattern of the cushioning strips can be modified from the illustrated arrangement without departing from the spirit of the present invention.

The cushioning means 12 is constructed of polyester urethane or other similar soft, sponge-like plastic material and has a thickness T-2 that is preferably relatively thick as compared to the thickness T-1 of resilient sheet portion 10. It has been determined that the swatter blade works effectively when the thickness T-2 is at least twice as great as thickness T-1, with the density of the polyester urethane cushioning material being between 1½ and 5 pounds per cubic foot.

As seen in FIG. 1, the composite blade construction is provided with a handle portion 8 that can be secured to the blade portion by any suitable means such as the staples 16.

In operation when the swatter blade contacts a fly at one of cushioning strips 18, 20, 22, 24 ro 26, the soft, sponging plastic material readily compresses at the area of contact with the insect while the balance of the cushioning area retards total compression and prevents crushing.

In the event the fly is positioned between the cushioning strips, such strips retard and cushion movement of the relatively rigid and hard sheet 10 after the cushioning strips contact the swatted surface and prior to contact of the fly by resilient sheet 10. Here the fly's being killed by crushing is avoided by the composite action of relatively rigid sheet 10 and soft sponge-like cushioning means 12.

I claim:

1. A fly swatter blade comprising, in combination, a sheet means of resilient polyethylene material provided with openings; and cushioning means formed of soft, sponge-like polyester urethane material having a density of between 1 ½ and 5 pounds per cubic foot including strips bonded to one side of said sheet at about the peripheral edge thereof with spaced transverse strips extending therebetween, and wherein the thickness of the cushioning means is at least twice that of the sheet means.

* * * * *